United States Patent Office.

JAMES WEBSTER, OF BIRMINGHAM, GREAT BRITAIN.

Letters Patent No. 94,532, dated September 7, 1869.

---

IMPROVED METALLIC ALLOY FOR FILTERING OILS, AND FOR THE MANUFACTURE OF PAINTS, CEMENTS, &c.

---

The Schedule referred to in these Letters Patent and making part of the same.

---

*To all whom it may concern:*

Be it known that I, JAMES WEBSTER, of Birmingham, in the county of Warwick, in the United Kingdom of Great Britain and Ireland, have invented "an Improved Porous Metallic Alloy, which may be cast into blocks or other forms, and used for filtering oils or spirits, and afterward be pulverized or ground and manufactured into cement for coating stone or other materials, for preventing decay, and be used for preventing the oxidation of iron;" and I do hereby declare that the following is a full and exact description thereof; that is to say—

In carrying out the said invention, I melt zinc or zinc dross in an ordinary crucible, and when heated to about 700° Fahrenheit, I dip iron-wire or scrap-iron, the weight of the iron being about one-tenth of that of the zinc, first into chloride of zinc, then into chloride of ammonia, or sal-ammoniac, and afterward into the molten zinc, the whole being thoroughly agitated until the iron is dissolved or taken up by the zinc, keeping the metals covered, during the process, with a flux, composed of equal quantities of chloride of sodium and chloride of ammonium.

While the alloy is in a molten state, I add thereto, and thoroughly mix therewith, about one and a half per cent. of antimony.

The alloy thus treated, I run or cast into blocks, or such forms as are required, and use it, either solid or pulverized, as a filtering medium for refining oils and spirits.

For making the metallic alloy into cement, I mix it with a small quantity of soda-ash and water, or diluted citric acid, and apply it, as required, with trowels, brushes, or other suitable tools.

For making the alloy into a substitute for paint, either before or after it has been used as above specified, it is pulverized and ground up with oleaginous matter, mixed, and applied in the usual way.

I claim—

1. The mode of producing the improved metallic alloy.
2. Its application, in a solid or pulverized form, as a filtering-medium, for refining oils and spirits.
3. Its use and application as a cement or coating, for preserving wood, stone, and other materials.
4. Its application for preventing the oxidation of iron-surfaces, when ground and mixed with oleaginous matter, as herein described.

JAMES WEBSTER.

Witnesses:
   WILLIAM BECK, C. E.,
     1 *Quality Court, Chancery Lane, London.*
   W. COOK,
     *Sutton, Surrey.*